United States Patent [19]

Fenton, Jr. et al.

[11] Patent Number: 4,501,539

[45] Date of Patent: Feb. 26, 1985

[54] APPARATUS FOR REMOVING THE LIQUID PHASE FROM A SLURRY OF FINE GRANULAR MATERIAL

[75] Inventors: Edward A. Fenton, Jr., Pittsburgh; Ira W. Lakin, Volant; Joseph H. Stein, Coraopolis; John R. Lohr, Pittsburgh; David A. Schreiber, Bethel Park, all of Pa.

[73] Assignee: Dravo Corporation, Pittsburgh, Pa.

[21] Appl. No.: 557,466

[22] Filed: Dec. 2, 1983

[51] Int. Cl.[3] .......................... B30B 9/02; B29C 3/00; B28B 1/26

[52] U.S. Cl. ...................................... 425/84; 210/351; 210/413; 44/10 G;; 44/10 L

[58] Field of Search ........................... 425/84, 85, 415; 210/768, 770, 777, 778, 413, 808, 350, 351; 44/10 R, 10 G, 10 L

[56] References Cited

U.S. PATENT DOCUMENTS

| | | | |
|---|---|---|---|
| 338,034 | 3/1886 | Cartier . | |
| 1,071,020 | 8/1913 | Bartholomew . | |
| 1,418,441 | 6/1922 | Howcott . | |
| 1,742,470 | 1/1930 | Harris . | |
| 1,826,729 | 10/1931 | Carver . | |
| 2,398,135 | 4/1946 | De La Roza . | |
| 2,697,979 | 12/1954 | MacMurray . | |
| 3,070,003 | 12/1962 | Stacy | 425/415 x |
| 3,116,595 | 1/1964 | Kent et al. . | |
| 3,234,598 | 2/1966 | Quinn | 425/85 X |
| 3,368,478 | 2/1968 | Clar . | |
| 3,450,054 | 6/1969 | Halwas et al. . | |
| 3,520,411 | 7/1970 | Busse et al. . | |
| 3,697,324 | 10/1972 | Steele et al. . | |
| 3,797,245 | 3/1974 | Hein . | |
| 3,802,335 | 4/1974 | Longo . | |
| 3,848,525 | 11/1974 | Kent et al. . | |
| 4,124,333 | 11/1978 | Liesener . | |
| 4,125,068 | 11/1978 | Linnerz . | |
| 4,208,188 | 6/1980 | Dick | 44/10 G X |
| 4,420,404 | 12/1983 | Coate et al. | 210/808 |

*Primary Examiner*—J. Howard Flint, Jr.
*Attorney, Agent, or Firm*—Parmelee, Miller, Welsh & Kratz

[57] ABSTRACT

The drain openings in movable and fixed platens in a press unit are wider than the largest praticle in a slurry to be dewatered and are formed by arcuate ribs dimensioned to resist the transverse forces developed as the granular particles from bridges across the slotted drain openings in rendom order. Liquid expressed through the movable platen is directed radially outward through a subplaten, passes back through the clearance between the piston carrying the movable platen and the mold wall and is discharged through a sealing and collecting ring having a series of annular grooves which communicate with longitudinal radially extending slots having longitudinal bores at the radial extremity thereof which direct the liquid to an annular passage for discharge. The mold is movable and is mounted on, and is essentially supported by, the piston by a frame which adjusts for mold droop to assure reregistry of the piston with the sealing and collecting ring following withdrawal of the piston for charging the mold with slurry. The movable molds of opposed horizontal press units acting on opposite sides of a vertical wall are actuated by angularly distributed overlapping hydraulic cylinders to form a compact double press. The rate of flow of pressurized hydraulic fluid acting on the pistons is increased after the bridges have formed over the drain openings and the hydraulic pressure acting on the two pistons is permitted to vary within preset limits to speed up production. Interchangeable platens, molds, pistons and sealing and collecting rings make possible rapid adaptation for a particular slurry.

28 Claims, 16 Drawing Figures

APPARATUS FOR REMOVING THE LIQUID PHASE FROM A SLURRY OF FINE GRANULAR MATERIAL

BACKGROUND OF THE INVENTION

This invention relates to apparatus for forming consolidated pucks of granular material from a slurry by applying pressure to the slurry in a hydraulic press to remove the liquid phase.

Commonly owned U.S. Pat. application Ser. No. 330,227 filed on Dec. 14, 1981 in the names of David W. Coate and Joseph G. Selmeczi and entitled "Apparatus and Process for Dewatering Fine Granular Material" which is a continuation in part of U.S. Pat. application Ser. No. 226,691 filed on Jan. 21, 1981 but now abandoned, discloses apparatus for dewatering granular materials in which a press is provided with drain openings which are one to five times larger in their smallest dimension than the size of the largest particle in the slurry. While it might appear at first that such a press could not dewater the granular material since the granules being smaller than the slots would just be expressed with the liquid phase, in fact after an initial loss of some granular material, the granules form bridges across the slots which act as filters to retain the bulk of the granular material. Such apparatus is self-cleaning and will not clog because the particles are not large enough to become lodged in the drain openings and the initial flow of liquid removes any residue of the bridges which are, for the most part, removed as part of the consolidated puck.

In such a press, the rate of movement of the piston must be slow enough that the granular material does not just blow through the drain openings without bridging. This is a limiting factor on the rate at which pucks can be formed. We have also found that bridging does not occur simultaneously in all the slots and that as a result, an unequal transverse force is imposed on the walls forming the sides of adjacent drain openings when one is bridged and the other is not. This requires that the structure between the drain openings be strong enough to resist these transverse forces which in turn places a limitation on the number of drain openings and thereby limits the rate of discharge of the liquid phase.

While it has been suggested in the past that a more compact press can be made by placing opposing press units on opposite sides of a central planar member, in the past the object has been to keep the forces generated by the two press units equal so that no net force was applied to the central planar member. This was accomplished by simply supplying pressurized hydraulic fluid to the opposed press units from a common source. While this permits the use of a relatively thin, lightweight central planar member, it increases the time required to form the pucks of granular material. Due to variations in the consistency of the slurry, the pressure versus time function for each press unit supplied with hydraulic fluid at a constant flow rate is not a smooth curve but exhibits positive and negative deviations from the theoretical function. By connecting both press units to a common source of pressurized hydraulic fluid at a given flow rate, the combined units are always operating at the pressure dictated by the press unit which is at the lowest point on its pressure versus time curve. Thus, it takes longer for the two interconnected units to produce two pucks than it would if each unit was operated separately where at least some of the time the pressure would be above the expected value.

In order to overcome these limitations of the prior art presses while making use of some of their advantages, the present invention has the following objectives.

It is the principle object of the present invention to provide apparatus which will rapidly and efficiently remove the liquid phase from slurries containing granular material.

It is a subordinate object of the invention to achieve the above objective by utilizing a press which has drain openings which are one to five times larger in the smallest dimension than the size of the largest particle in the granular material in the slurry.

It is another object of the invention to provide such a press in which the flow of hydraulic fluid to the press is increased after the granular material has formed bridges over these drain openings.

It is yet another objective of the invention to provide a press which has such drain openings on the piston as well as in a fixed wall of the press cavity to permit more rapid removal of the liquid phase.

It is an additional object of the invention to provide such a press which utilizes a sliding mold cavity to form the pucks of granular material.

It is also an object of the invention to provide such a press in which the sliding mold is substantially fully supported by the associated piston.

It is still another object of the invention to provide such a press with interchangable parts which allow for the selection of drain opening size and puck size suitable for the particular slurry being pressed.

It is a further object of the invention to provide a compact press satisfying the above objective with two opposed presses forming separate pucks simultaneously on two sides of a planar member.

It is a still further object of the invention to allow the pressure in the two presses on opposite sides of the planar member to vary within preselected limits which provide limited balancing of the forces on opposite sides of the planar member while decreasing the time required to form two pucks of granular material.

SUMMARY OF THE INVENTIONS

These and other objectives are realized by apparatus for removing the liquid phase from a slurry of fine granular material having drain openings which maximize the area through which the liquid phase is expressed while having sufficient strength to resist the lateral forces developed as the fine granular material forms bridges across the drain openings in random order. The drain openings are provided in platens which are secured to the piston or die of the press and to the opposed wall so that liquid is drained from both ends of the press chamber simultaneously. The platens are planar members defining arcuate slots which form a pattern of segmented concentric annular openings which serve as the drain openings. The slots are defined by arcuate ribs which are stiffer than straight ribs, with the lengths of the arcuate ribs selected such that all of the ribs have essentially the same radial strength determined by the radial width, the radius of curvature and the length of the rib. The slots are angularly longer near the center of the platen where the radii are shorter than near the periphery. The width of the slots is at least as large as the largest particle in the granular material, and the total area of the arcuate slots across the platen is maximized for a selected slot width and radial strength for the arcuate ribs. Subplatens mounted behind the platens have annular grooves which register with the arcuate slots in the platen to receive liquid expressed through the slots and radial grooves which carry liquid from the annular grooves radially outward for discharge.

Liquid expressed through the arcuate slots in the platen mounted on the piston of the press, passes radially outward through the subplaten and then travels back along the piston in the clearance between the piston and the bore in the press mold housing. In order to prevent dilution of the slurry feed which is introduced through a feed opening in the mold housing with the piston retracted, collection means in the form of an annular restriction is provided in the wall of the mold bore short of the feed opening to collect the expressed liquid and to form a seal. The restriction has at least one annular groove which intersects a plurality of longitudinal slits spaced angularly around the bore and extending radially outward. The width of these slits is essentially the same as that of the arcuate slots in the platen but wider than the clearance between the piston and the restriction. Expressed liquid which passes back along the piston enters the annular grooves in the piston, travels circumferentially around to a slit where it is carried radially outward to longitudinal bores at the radial extremity of the slits. The longitudinal bores connect with an annular passage which directs the liquid to a radial discharge passage. Preferably, the mold housing includes replaceable molds of varying size, and the restriction is in the form of interchangeable ring members which define the annular grooves, longitudinal radially extending slits, and longitudinal bores through which the liquid is expressed and are held in place in the mold housing by the replaceable molds. In this modular arrangement, the annular collection passage is formed between the ring member, the housing and the mold by a shoulder on the replaceable mold.

Preferably, the mold assembly of the press is of the type which is slideable toward and away from a rigid vertical wall so that the puck of consolidated granular material can be stripped from the press by first retracting the piston slightly and then withdrawing the mold assembly which drops the puck downward onto a conveyor. With such a moveable mold assembly, it becomes very difficult to maintain alignment of the piston with the ring member of the collecting and sealing means when the piston is withdrawn through the ring member to charge additional slurry into the mold, and then advanced again through the ring member toward the rigid vertical wall. In accordance with the invention, alignment is maintained despite the close clearences by mounting the slidable mold assembly on the piston. Thus, while hydraulic cylinders are pivotably connected to the mold assembly to reciprocate it toward and away from the rigid vertical wall, the weight of the mold assembly is essentially supported by the piston. The mold assembly is supported on the piston by a frame connected to the free end of the mold housing so that the mold assembly is cantilevered from the frame and does not contact the piston even when the latter is fully extended into the mold. In order to accommodate for droop of the cantilevered mold assembly which is especially critical in assuring that the piston will pass through the ring member when the piston is advance after charging the mold cavity with slurry, the frame defines a bearing surface facing the piston which is inclined at an angle to the longitudinal axis of the mold bore. A bearing member with a bearing surface which makes an equal but opposite angle with the mold bore and is in sliding contact with the frame bearing surface, has a support surface which contacts the cylinderical surface of the piston. By sliding the bearing member longitudinally along the bearing surface of the frame, the frame moves radially relative to the piston to adjust the alignment of the mold relative to the longitudinal axis of the piston. Two of these bearing members which cooperate with bearing surfaces on either end of the frame making equal but opposite angles with the axis of the mold assembly are adjusted from the free end of the frame by bolts extending longitudinally through the frame.

Preferably, two press units, each with a mold slidably supported on the piston of an associated hydraulic cylinder, are mounted in essentially axial alignment on opposite sides of the rigid vertical wall. Each of the molds is reciprocated along its piston by a pair of actuating means, such as additional hydraulic cylinders, connected at diametrically opposite points to the mold. The actuating means associated with each mold are angularly displaced with respect to those associated with the other mold and longitudinally overlap them to form a very compact double press unit.

In order to speed up operation of the twin opposed press units, the pressure in the two hydraulic cylinders is permitted to vary within preset limits which are selected to allow the two presses to operate for the most part at their own best rate while still not requiring the common end wall to sustain a sizeable net force. To further increase the production rate, the piston in each press is initially advanced at a rate which is slow enough to permit bridging of the drain openings by the granular material, and after the bridges have formed the rate of advancement is increased to expedite discharge of the liquid phase. This is accomplished by a mechanism which increases the volumetric output of a variable displacement pump which supplies the pressurized hydraulic fluid to the press cylinder in response to an increase in pressure in the cylinder above a value indicative that the bridges have formed which is set by a variable spring bias.

DESCRIPTION OF THE PREFERRED EMBODIMENT

Figure 1:
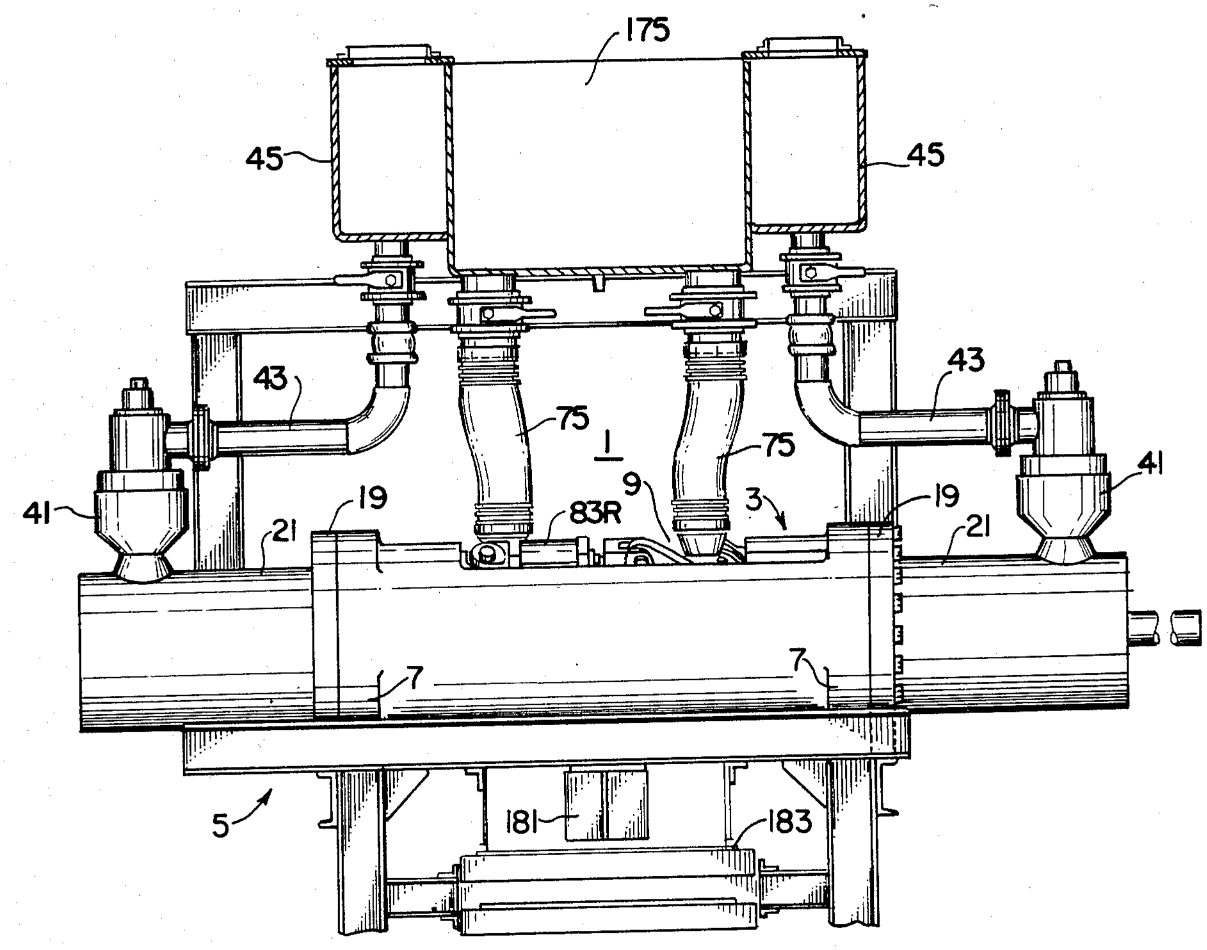
FIG. 1 is a side elevation view of a dewatering press constructed in accordance with the teachings of the invention.
Figure 2:
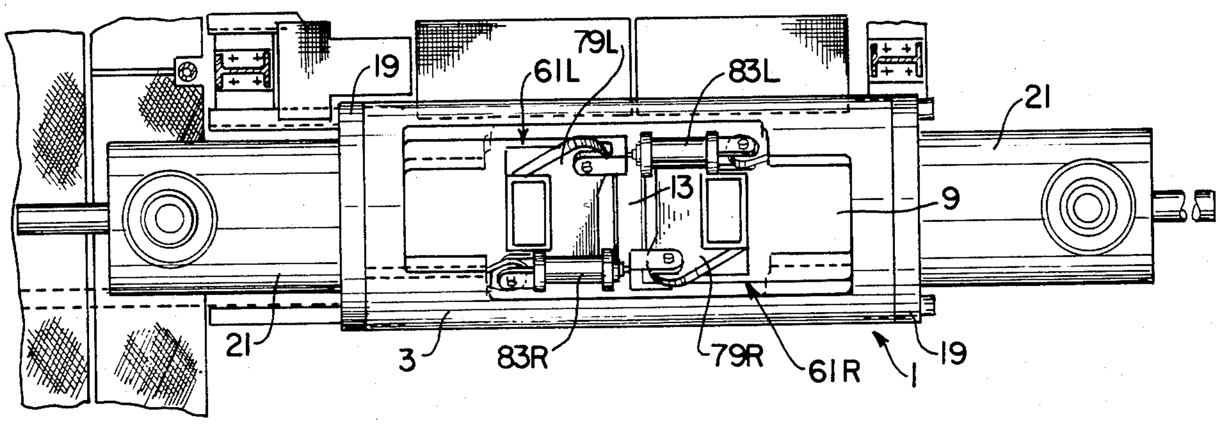
FIG. 2 is a top plan view of the apparatus of FIG. 1 with some parts removed for clarity.

As shown in FIGS. 1 through 4, the dewatering press 1 according to the invention comprises a cylindrical main housing 3 supported horizontally on a structural frame 5 by bosses 7 on each corner. The cylindrical wall of the housing 3 is cut out at the top and bottom to form elongated openings 9 and 11 respectively, and a centrally located transverse wall 13 divides the interior of the housing 3 into two chambers 15. Since the apparatus is symetrical in many respects on either side of this transverse wall, corresponding parts on each side are identified in the drawings by the same reference character with the suffix L for left or R for right added only where it is necessary for clarification. Hence, the chamber 15 in the main housing to the left in the figures of the transverse wall 13 is identified as 15L and that to the right as 15R.

Figure 8:
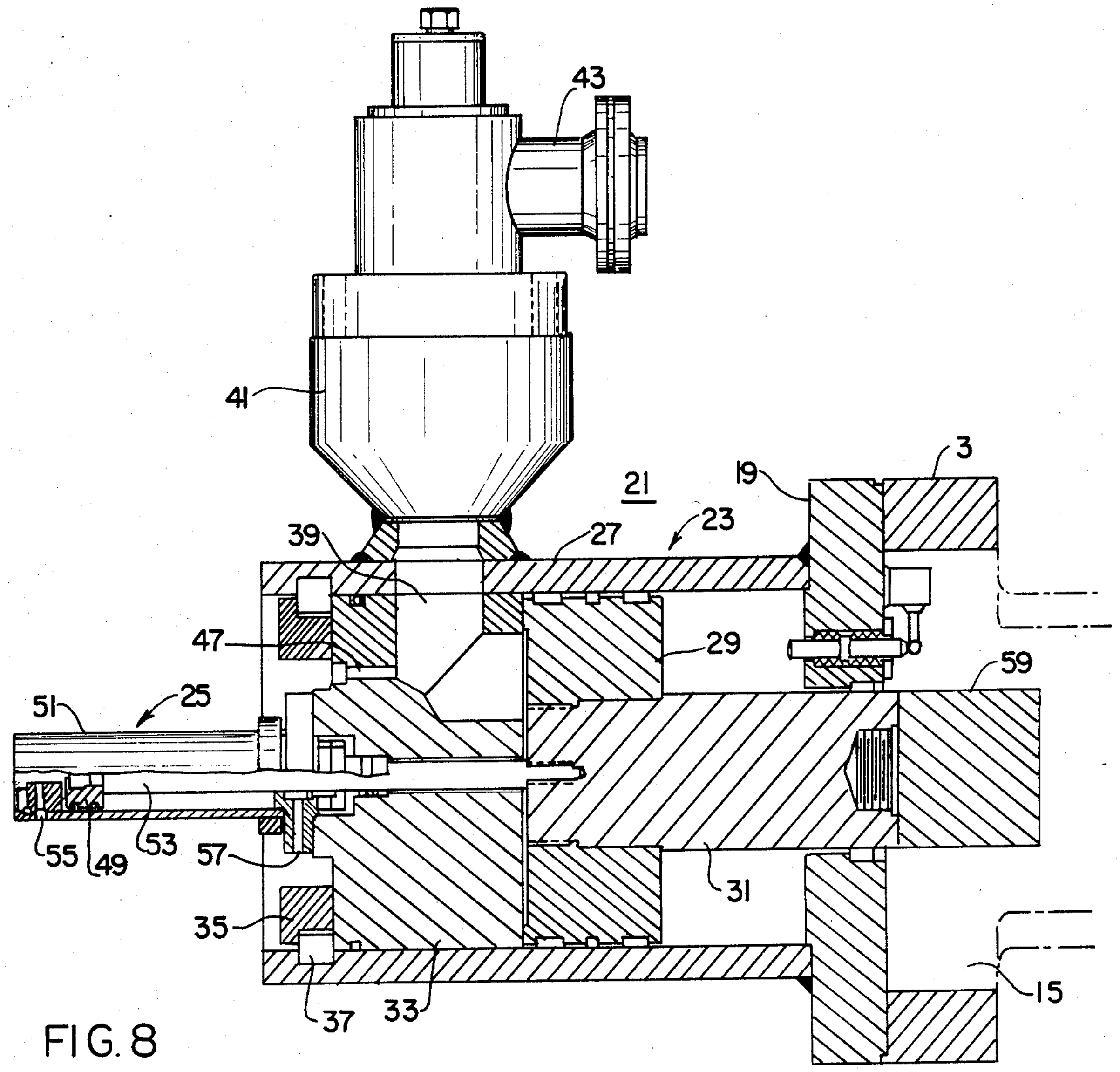
FIG. 8 is a vertical section through the main and auxiliary cylinders of the press.

Bolted to each end of the housing 3 by end plate 19 is a hydraulic ram assembly 21 which includes a main pressure cylinder 23 and a kicker cylinder 25. As shown in FIG. 8, each main pressure cylinder 23 includes a cylindrical housing 27 welded to end plate 19 in which a main piston 29 is reciprocally slidable. A main piston rod 31 secured to the main piston 29 extends through end plate 19 into the adjacent chamber 15 in the main housing. A plug 33 is retained in the end of housing 27 by a retainer ring 35 and snap ring 37 and is provided with a passage 39 which communicates with one side of the main piston 29 and extends through the side wall of the main cylinder housing 27 to communicate with a prefill valve 41. The prefill valve 41 is connected by conduit 43 to a hydraulic fluid reservoir 45 mounted on top of the structural frame 5 (See FIG. 1). A longitudinal passage 47 in block 33 communicates with the passage 39 and is threaded to receive a high pressure hydraulic line (not shown).

The kicker cylinder 25 is a double acting hydraulic ram having a piston 49 slidable within a housing 51 and a piston rod 53 connected to the kicker piston 49 and the main piston rod 31. Pressurized hydraulic fluid is applied to or withdrawn from one side of the kicker piston 49 through passage 55 and the other side through passage 57.

Figure 3:
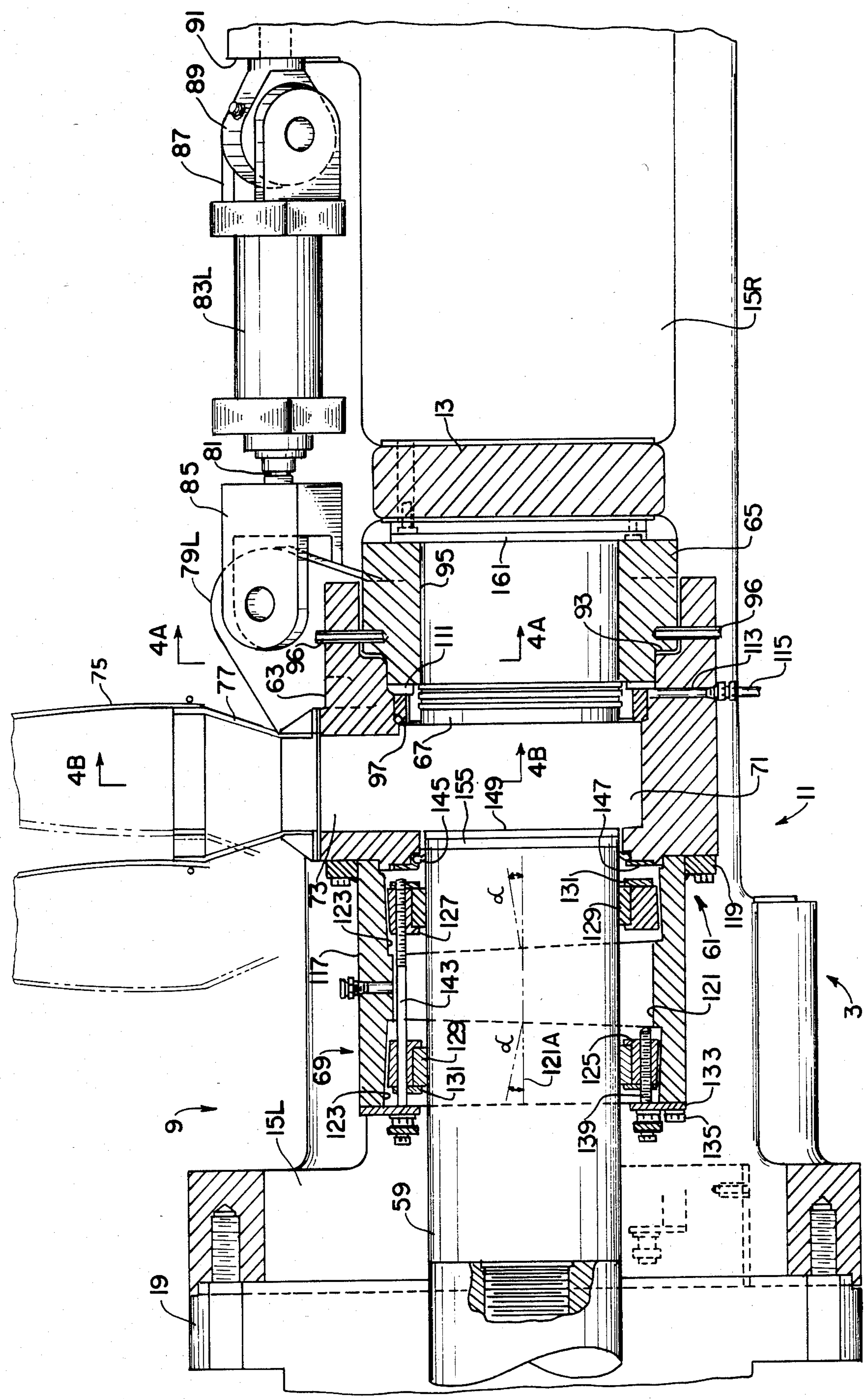
FIG. 3 is an enlarged vertical section through a portion of the apparatus of FIG. 1.
Figure 4:
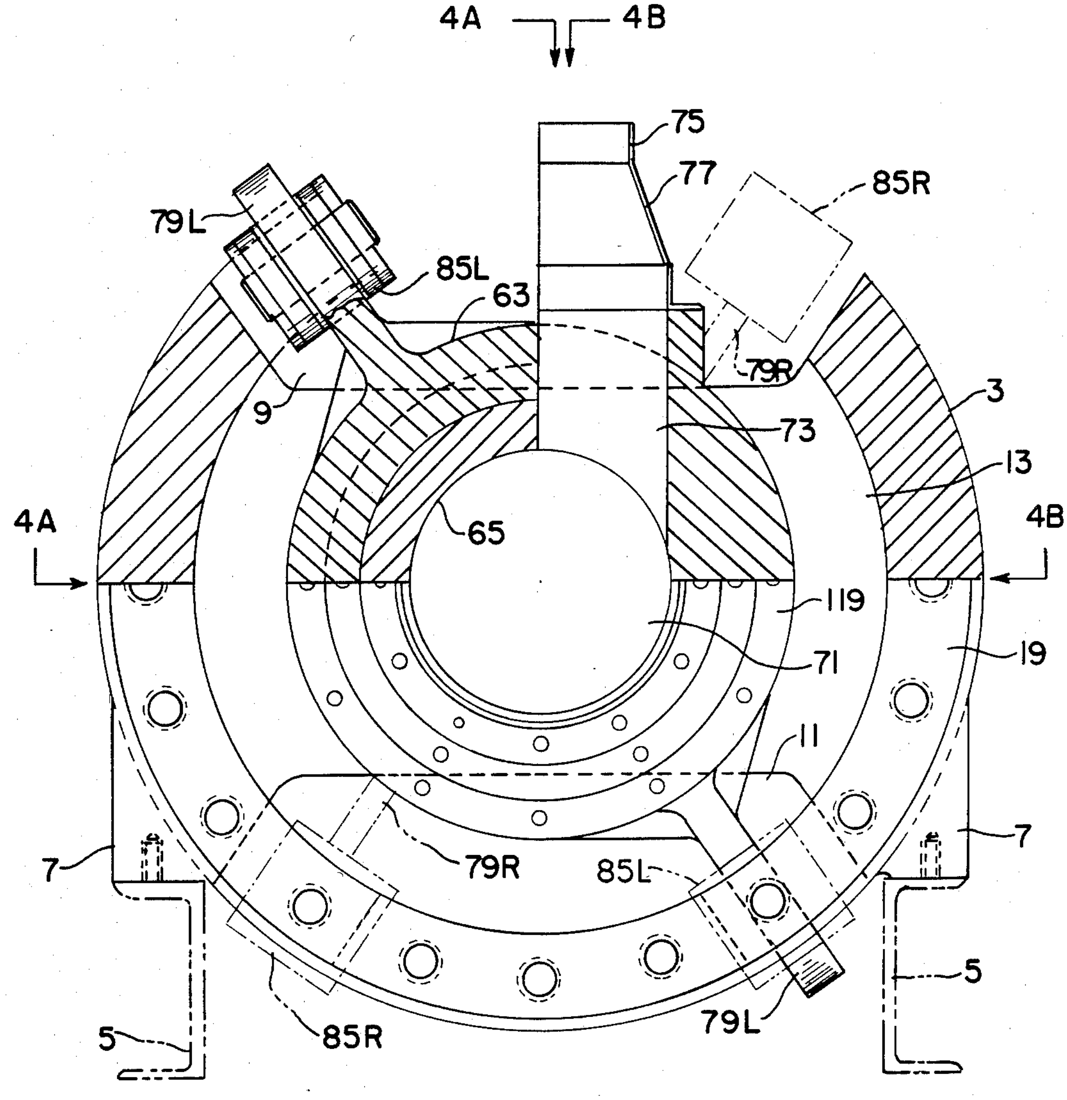
FIG. 4 is an end view of the apparatus shown in FIG. 3 with two sectors sectional along the lines 4A and 4B in FIG. 3.

Threadedly coupled to the end of the main piston rod 31 as an extension thereof is a cylindrical die 59. This die 59 extends through the chamber 15 of the main frame 3 and can be extended or retracted relative to the transverse wall 13 by the hydraulic ram assembly 21. As can be seen in FIG. 3, mounted on the cylindrical die 59 and supported thereby is a mold assembly 61 which includes a mold carriage 63, a mold 65, a sealing and collector ring 67, and a mold mount 69. The mold carriage 63 is a hollow cylindrical member having a longitudinal bore 71 and a rectangular feed opening 73 in the top thereof which communicates with the bore and to which a flexible feed conduit 75 is connected through a funnel shaped coupling 77. Diametrically opposed bosses 79 extend radially outward from the mold carriage 63 along an axis which is 45° off the vertical (See also FIG. 4). A piston rod 81 of a hydraulic cylinder 83 is connected by a clevis 85 to each boss 79 while the cylinder housings are each connected by another clevis 87 to an eye bolt 89 screwed into a shoulder 91 formed by the cut outs 9 and 11 in the main housing 3. Operation of the hydraulic cylinders 83 causes the mold carriage 63 and its connected assemblies to reciprocate in the chamber 15 in the main housing 3 toward and away from the transverse wall 13. By placing the bosses 79 on a 45° bias, the two pairs of hydraulic cylinders 83L which operate the mold carriage in the left chamber and 83R associated with the mold carriage in the right chamber can overlap without interference.

Figure 5:
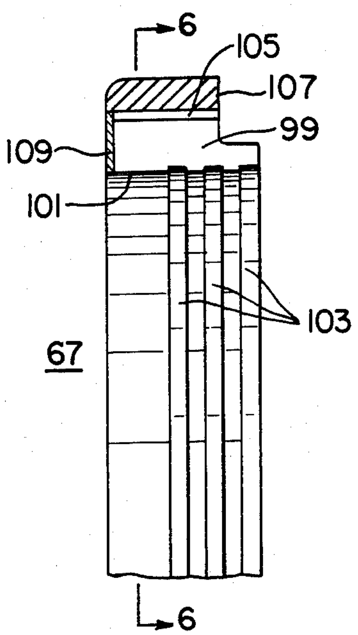
FIG. 5 is an edge view, in enlarged scale, of a sector of a sealing and collector ring which forms a part of the assembly shown in FIG. 3.
Figure 6:
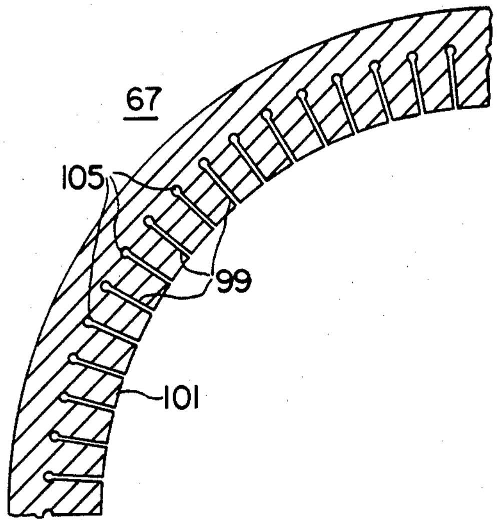
FIG. 6 is section through the sealing and collector ring sector shown in FIG. 5 taken along the line 6—6.

The end of the bore 71 in the mold carriage 63 which faces the transverse wall 13 is counterbored to form a shoulder 93 against which an external shoulder on the cylindrical mold 65 seats. Replaceable molds 65 with longitudinal bores 95 of selected diameter are secured in the mold carriage 63 by radial friction fit pins 96. The mold also holds in place the sealing and collector ring 67 which seats against another shoulder 97 formed by a counterbore in the bore 71 of mold carriage 63. The sealing and collector ring 67, which is shown in assembly in FIG. 3, in fragmentary axial section in FIG. 5 and fragmentary transverse section in FIG. 6, is an annular member which has a plurality of angularly spaced, radial slits 99 radiating from the inner surface of annular bore 101. A plurality of annular grooves 103 in the surface of bore 101 each intersect each of the slits 99. Each of the slits 99 is terminated at its outer extremity by an axial bore 105. The slit 99 and bores 105 communicate with an external, annular groove 107 in one end of the annular member and are blocked at the other end by an annular seal 109. When the ring 67 is in place in the mold assembly 61, the annular groove 107 forms with the bore 71 in the mold carriage 63 and the end of the mold 65 an annular passage 111 which communicates with all of the radial slits 99 and axial bores 103 to collect fluid therefrom, and with a radial bore 113 in the bottom of the mold carriage which is connected to a discharge line 115.

The mold assembly 61 is supported on the die 59, which is an extension of main piston rod 31, by mold mount 69. The mount 69 includes a cylindrical housing 117 which is secured to the mold carriage 63 by a ring 119 welded to the housing and bolted to the end of the mold carriage. The housing 117 has an axial bore 121 with counterbores 123 at each end which are milled at an angle $\alpha$ to the axis 121A of bore 121. An adjusting ring 125 or 127 having an outer surface skewed at the same angle $\alpha$ to its bore is slidably received in each counterbore. A ring bearing 129 is secured in a groove in the inner surface of each adjusting ring 125 and 127 by a retainer ring 131. Together, the adjusting ring, ring bearing and retainer ring form a bearing member.

Figure 7:
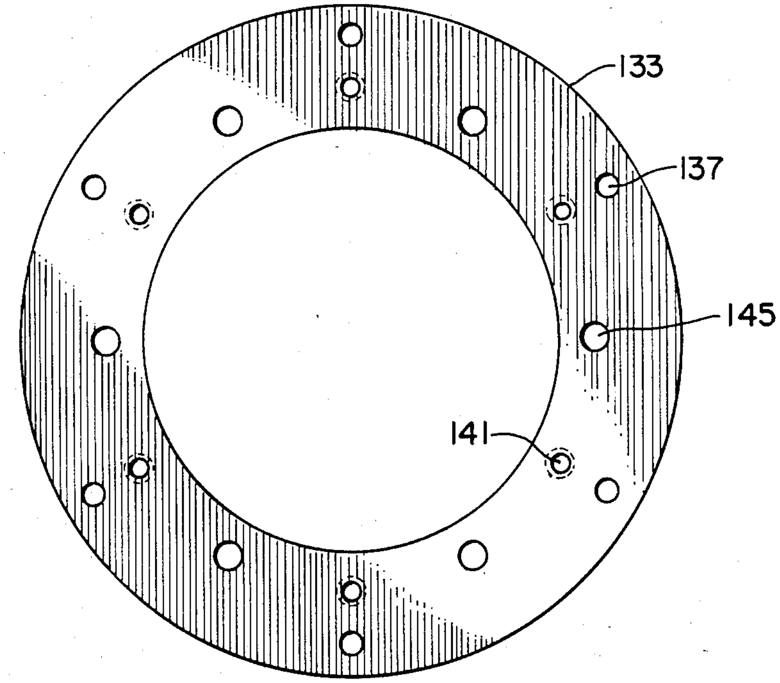
FIG. 7 is an end view of a mold mount end plate which forms a part of the assemblies shown in FIGS. 3 and 4.

An end ring 133 is bolted to the end of carriage mount housing 117 by six bolts 135 passing through angularly spaced bores 137 in the end ring (see FIG. 7). Six angularly spaced adjusting bolts 139 passing through a locking ring 140 and bores 141 in end ring 133 threadedly engage adjusting ring 127. Six additional adjusting bolts 143 passing through the locking ring 140 and bores 145 in end ring 133 threadedly engage adjusting ring 127 but only pass through adjusting ring 125. The ring bearings 129 slidably engage the die 59 to support the weight of the entire carriage assembly 71. As will be discussed in more detail below, the die 59 slides through the ring bearings 129, passes through the sealing and collector ring 67 and enters the bore 95 of the mold during the pressing stroke but does not touch the sealing and collector ring or the walls of the mold. Thus, these parts and the mold carriage 63 are cantilevered from the mold support 69. Since, for reasons to be discussed, the clearance between the die 59 and the sealing and collector ring 67 is necessarily small, accommodation must be made for droop of the cantilevered load. The camming action, which occurs between the skewed counterbores 123 in the mold support housing 117 and the similarly skewed outer surfaces of adjusting rings 125 and 127, provides the necessary adjustment. Through coordinated adjustment of the bolts 139 and 143, the adjusting rings 127 and 129 respectively are caused to slide along the surfaces of the counterbores 123 to tilt and translate the axis of the carriage assembly appropriately with respect to the axis of the die 59 so that the latter slides through the sealing and collector ring 67 without contact. A resilient seal 145 secured in a counterbore in the end of mold carriage 63 by annular retainer plate 147 prevents escape of the slurry from bore 71.

Figure 9:
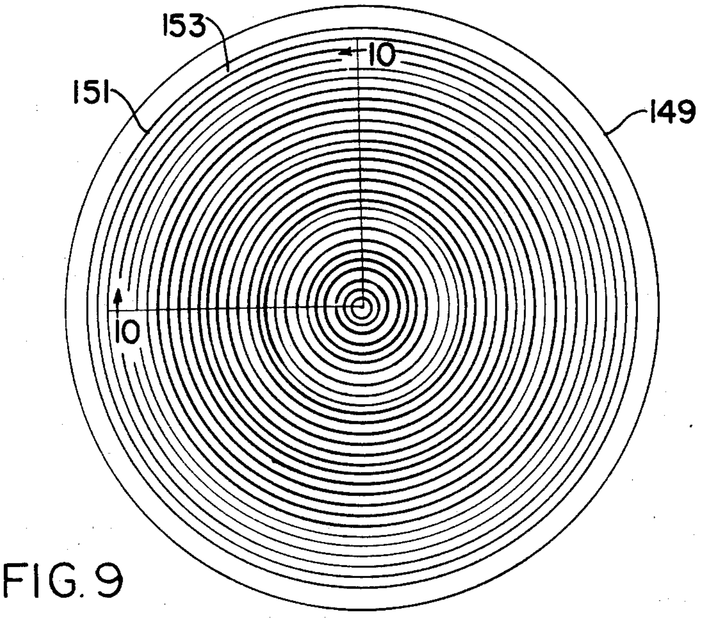
FIG. 9 is a plan view of a platen incorporating features of the invention which is mounted on the end of the piston forming part of the subject press.
Figure 10:
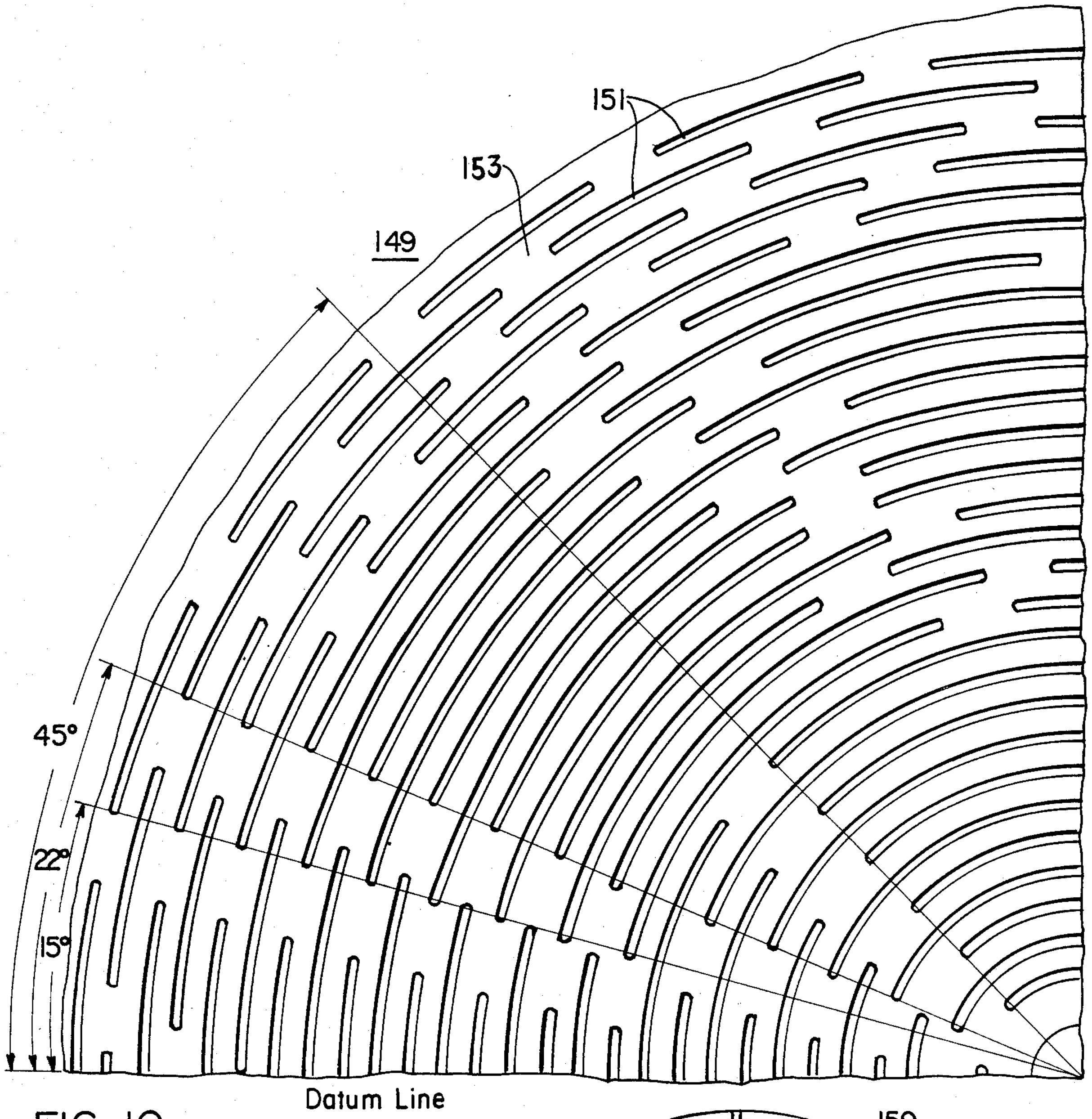
FIG. 10 is an enlarged view of portion of a sector of the platen of FIG. 9 illustrating the details of the drainage openings.

In order to express the liquid phase from the material to be dewatered, a slotted, circular platen 149 is bolted at its center to the end of the die 59. As shown in general in FIG. 9 and in detail in the sector illustrated in FIG. 10, the platen 149 is provided with sectors of concentric annular slots 151 which are defined by annular ribs 153. The width of the slots 151 is selected to be one to five times larger than the largest dimension of the largest sized particle of granular material in the slurry being dewatered in accordance with the teachings of commonly owned U.S. patent application Ser. No. 330,227 filed on Dec. 14, 1981 in the names of David W. Coate and Joseph G. Selmeczi and entitled "Apparatus and Process for Dewatering Fine Granular Material" which is a continuation-in-part of U.S. patent application Ser. No. 226,691 filed on Jan. 21, 1981 and which is incorporated by reference herein. This application teaches the surprising fact that even though the slotted openings in the platen are larger than the largest particle in the material being dewatered, the particles form a bridge across the slots after an initial loss of a small percentage of the particles. This bridge acts as a filter which allows the fluid to be expressed while the particles are retained, but without causing plugging of the slots.

Figure 11:
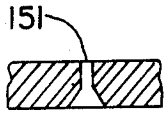
FIG. 11 is a section through a portion of the platen shown in FIGS. 9 and 10.

We have found that bridging does not occur simultaneously in all of the slots in the platen 149. Before a bridge forms, the hydraulic pressure within the slot is a substantial proportion of the pressure in the press, but the pressure drops drastically after the bridge forms. Due to the high pressures utilized in the press, on the order of 5000 to 20,000 psi., this results in a considerable radial load on a rib 155 between a bridged slot and a radially adjacent unbridged slot. If the rib is not stiff enough to resist the load, the unbridged slot will widen thereby delaying bridging and permitting excessive loss of granular material with the effluent. To counteract this problem, we have made the slots annular sectors so that the ribs are arcuate and are therefore stiffer and of higher strength than straight beams. The width of the slots is determined, as mentioned above, by the particule size of the granular material being dewatered. However, the radial spacing between the slots and their length are selected to maximize the total open area while providing ribs which, dependent upon their radius, length and width, are strong enough to resist the radial loading possible for the operating pressure of the press. Accordingly, slots closer to the center of the platen where the radius is shorter can be angularly longer and/or can be placed closer together than those near the periphery. An example of slot radius, angular position of the slots with respect to the datum line shown in FIG. 10, the number of slots at each radius and slot length for an exemplary $9\frac{1}{2}$ inch platen with 0.007 inch wide slots is shown in Table 1. The radii shown are for the radial centers of the slots. The slots 151 flare outward toward the downstream face of the platen as illustrated in FIG. 11. This facilitates self-cleaning of the slots so that the press can be cycled continuously without blinding.

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| R | .321 | .407 | .493 | .579 | .665 | .751 | .837 | .923 | 1.009 | 1.095 | 1.181 | 1.267 | 1.353 | 1.439 | 1.525 |
| REF. TO DATUM LINE | 45° | 22°30′ | 45° | 22°30′ | 45° | 22°30′ | 45° | 22°30′ | 45° | 22°30′ | 45° | 15° | 22°30′ | 45° | 15° |
| No. OF EQUAL SPACES | 3 | 3 | 3 | 3 | 3 | 3 | 3 | 3 | 3 | 4 | 4 | 4 | 4 | 5 | 5 |
| "S" SLOT LENGTH | .423 | .603 | .783 | .963 | 1.143 | 1.323 | 1.503 | 1.683 | 1.864 | 1.470 | 1.605 | 1.740 | 1.876 | 1.558 | 1.667 |

| | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| R | 1.611 | 1.699 | 1.791 | 1.888 | 1.990 | 2.097 | 2.209 | 2.327 | 2.450 | 2.580 | 2.717 | 2.860 | 3.010 | 3.168 | 3.334 |
| REF. TO DATUM LINE | 22°30′ | 45° | 15° | 22°30′ | 45° | 15° | 22°30′ | 45° | 15° | 22°30′ | 45° | 15° | 22°30′ | 45° | 15° |
| No. OF EQUAL SPACES | 5 | 5 | 6 | 6 | 6 | 6 | 7 | 7 | 7 | 8 | 8 | 8 | 9 | 9 | 19 |
| "S" SLOT LENGTH | 1.775 | 1.885 | 1.626 | 1.727 | 1.834 | 1.946 | 1.733 | 1.838 | 1.949 | 1.776 | 1.884 | 1.996 | 1.851 | 1.962 | .852 |

| | 31 | 32 | 33 | 34 | 35 | 36 | 37 | 38 | 39 |
|---|---|---|---|---|---|---|---|---|---|
| R | 3.476 | 3.618 | 3.760 | 3.902 | 4.044 | 4.186 | 4.328 | 4.470 | 4.612 |
| REF. TO DATUM LINE | 22°30′ | 45° | 15° | 22°30′ | 45° | 15° | 22°30′ | 45° | 15° |
| No. OF | 20 | 21 | 21 | 22 | 23 | 24 | 25 | 25 | 26 |

-continued

| | | | | | | | | | |
|---|---|---|---|---|---|---|---|---|---|
| EQUAL SPACES "S" SLOT LENGTH | .842 | .832 | .875 | .864 | .855 | .846 | .838 | .873 | .864 |

Figure 12:
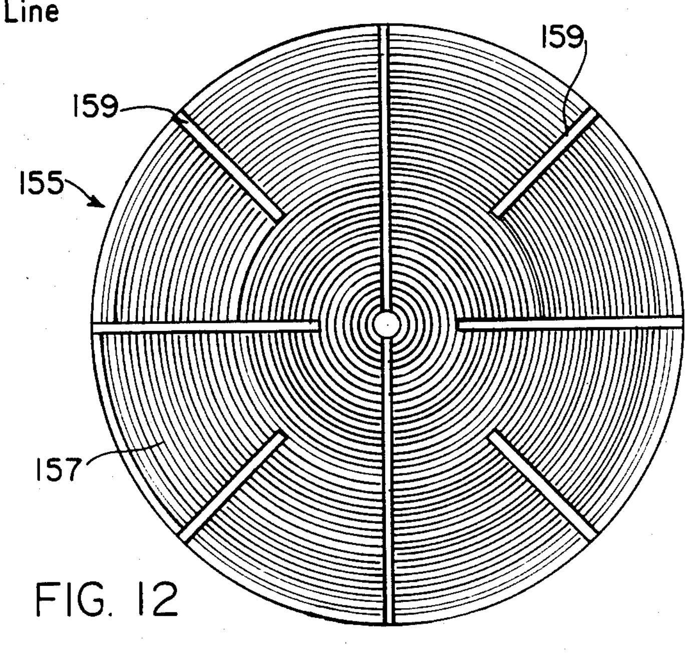
FIG. 12 is a plan view of the sub-platen that is mounted between the platen of FIGS. 9 and 10 and the piston.

Underneath the platen 149, and secured to the end of die 59 by the same central bolt, is a subplaten 155 which, as shown in FIG. 12, has a series of concentric, continuous, annular grooves 157 facing the platen which are radially aligned with the slots 151. Effluent expressed through the slots 151 in the platen 149 enters the grooves 157 and passes angularly around to one of several radially extending channels 159 where it travels outward to the periphery of the sub-platen for discharge.

Figure 13:
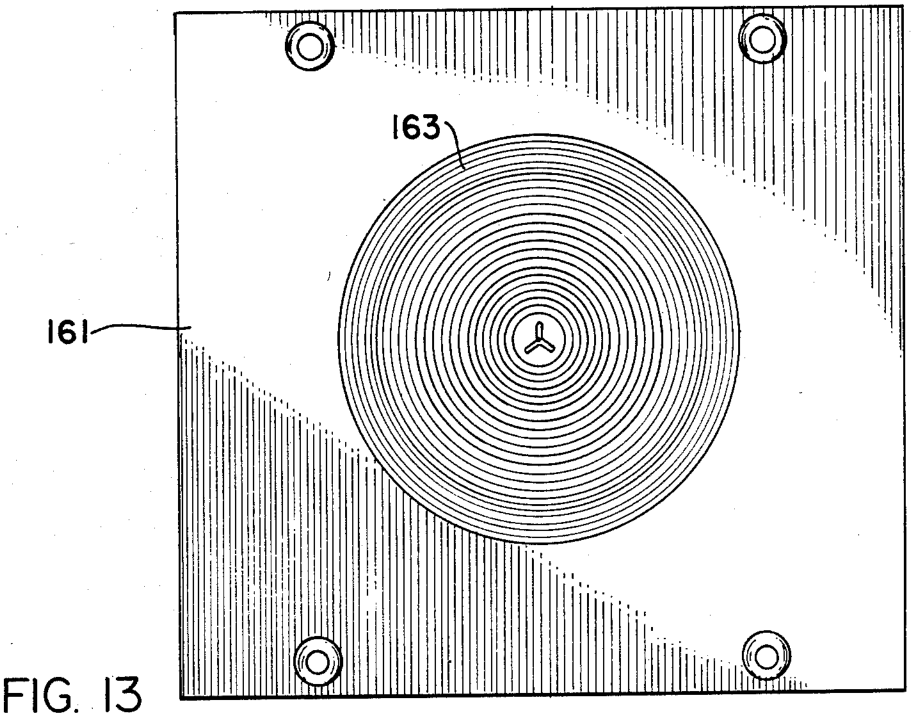
FIG. 13 is a plan view of a fixed platen in accordance with the invention used in the subject press.
Figure 14:
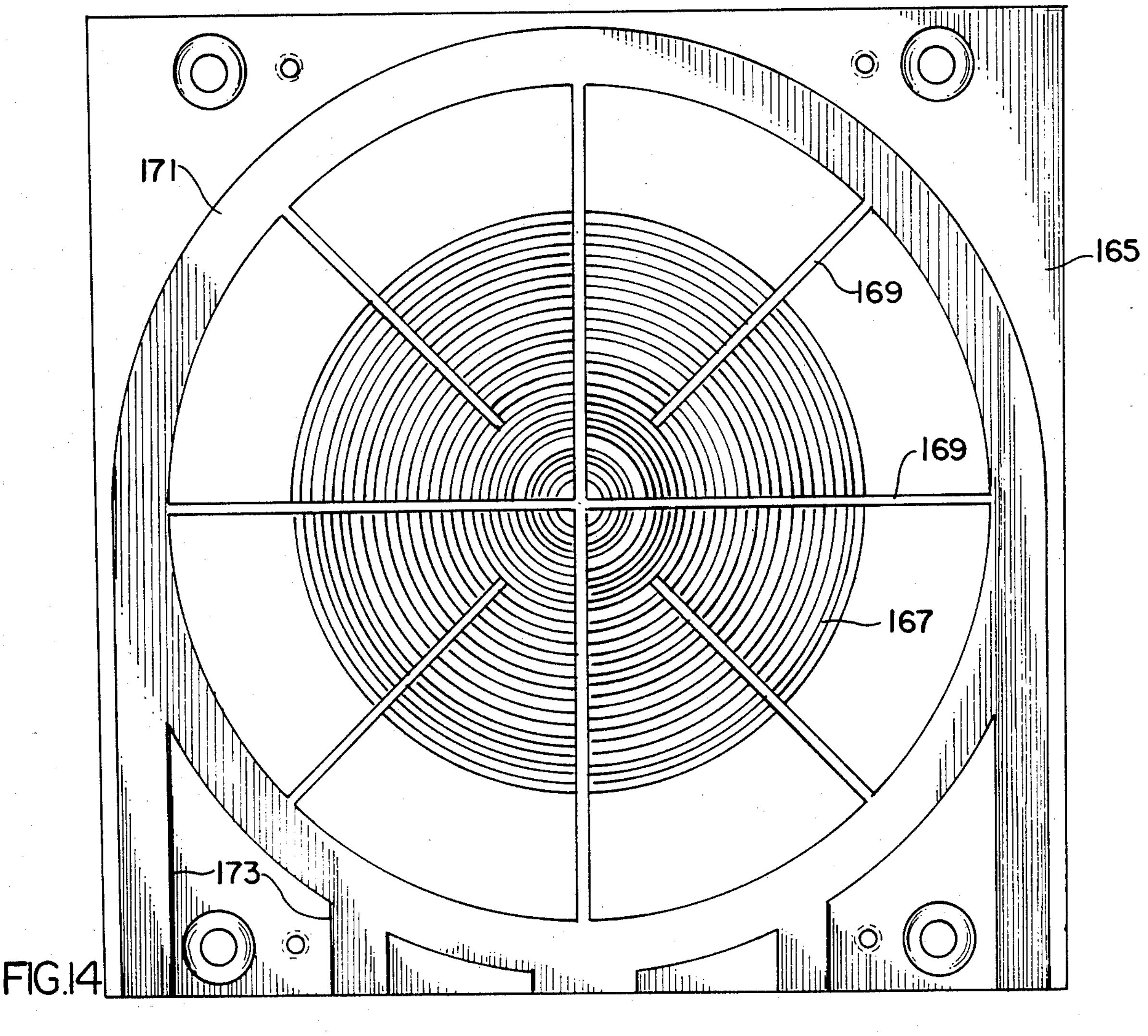
FIG. 14 is a plan view of a sub-platen used with the fixed platen of FIG. 13.

A rectangular platen 161 with a circular configuration of slots 163 similar to that in the platen 149 except for a Y slot in the center in place of the mounting hole as shown on FIG. 13, is bolted to the transverse wall 13 of the main frame 3 adjacent its four corners. As illustrated in FIG. 14, a sub-platen 165 mounted under platen 161 similarly has a series of continuous, annular grooves 167 aligned with the slots 163 in the platen and radial channels 169 intersecting each of these grooves. Effluent which passes radially outward through the channels 169, is collected in a large annular groove 171 and directed downward from the sub-platen for discharge by a series of linear channels 173.

Figure 15:
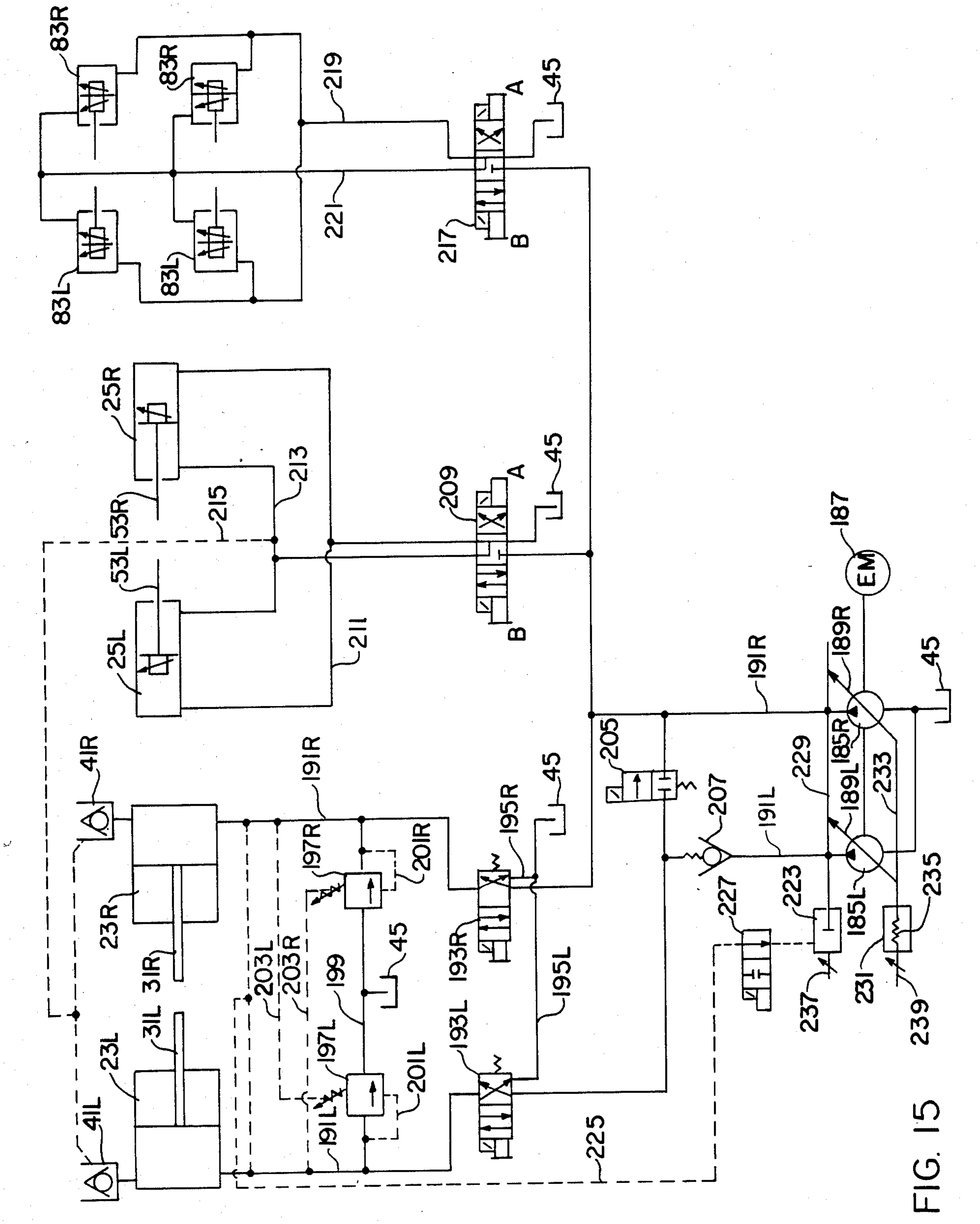
FIG. 15 is a simplified schematic diagram of the hydraulic system which operates the apparatus of the previous figures in accordance with the teachings of the invention.

The press 1 is operated by a hydraulic system which is shown schematically in simplified form in FIG. 15. In this system, a pair of variable displacement pumps 185L and 185R driven by a common electric motor 187 provide pressurized hydraulic fluid, at a flow rate determined by the position of their respective swash plates 189, to hydraulic lines 191. The lines 191 deliver this pressurized hydraulic fluid through two-position solenoid valves 193 to the respective main cylinders 23. These solenoid valves 193 are spring biased to the position shown in FIG. 15 in which hydraulic fluid from the main cylinders 23 is bled off through lines 195 to the hydraulic reservoir 45. When energized, the solenoid valves 193 direct pressurized hydraulic fluid from the individual pumps to one of the main hydraulic cylinders. If only one pump is used it is necessary to provide a flow divider which directs one-half the flow to each main cylinder.

In order to permit the hydraulic pressure in the two main cylinders 23 to differ, but only within preselected limits, a pair of pressure balancing valves 197 are connected in a shunt line 199 across the supply lines 191 between the solenoid valves 195 and the main cylinders 23. Pilot lines 201 and 203 apply hydraulic fluid from the two supply lines 191 to opposite ends of the shuttle in pressure balancing valves 197 which are spring biased closed so that the appropriate valve is opened to dump hydraulic fluid from the line with higher pressure to reservoir 45 when the pressure differential generates a force on the shuttle which exceeds the settable spring bias.

The variable displacement pumps 189 also deliver pressurized hydraulic fluid for operation of the kicker cylinders 25 and the mold positioning cylinders 83. However, instead of separately supplying hydraulic fluid to such cylinders on the two sides of the press as in the case of the main cylinders, the pumps 185 are interconnected through energization of solenoid valve 205 to service both of the kicker cylinders and all of the mold positioning cylinders through line 191R. Spring biased check valve 207 assures that the two pumps do not work against each other under these conditions.

The kicker cylinders 25 receive pressurized hydraulic fluid from the line 191R through three-position solenoid valve 209. When solenoid A of valve 209 is energized, hydraulic fluid is delivered through line 211 to the chambers of the double acting kicker cylinders 25 which extend the pistons 25 and is drained to the reservoir 45 from the other chambers through line 213. When solenoid B is energized the connections are reversed and the pistons of the kicker cylinders are retracted. As will be recalled from the earlier description, the kicker cylinders retract the pistons 31 of the main cylinders with them. While the solenoid valves 193 are effective to bleed the pressure off the main cylinders, a pilot line 215 connected to the line 213 opens the prefill valves 41 to discharge trapped hydraulic fluid from the main cylinders 23 rapidly to the reservoir 45 through line 43 (See FIG. 1). Similarly, a three-position solenoid valve 217 directs hydraulic fluid through line 219 to extend the piston rods of mold positioning cylinders 83 when solenoid A is energized and through line 221 to the other sides of the pistons to retract the piston rods when solenoid B is energized. Again, trapped hydraulic fluid from the opposite sides of the pistons is returned to the reservoir 45.

In order to increase the rate of advancement of the piston rods of the main cylinders 23 after bridges have been formed over the press drain openings, the volumetric outputs of the variable displacement pumps 185 are increased by tilting the swash plates 189 in a direction which increases pump output flow. This is accomplished by applying pressurized hydraulic fluid from the lines 191 just before main cylinders 23 to a hydraulic cylinder 223 through pilot line 225 and solenoid valve 227. With solenoid valve 227 deenergized, pressurized fluid in line 225 acts upon the plunger 229 of cylinder 223 which tilts the swash plates 189 of pumps 185 toward the maximum output position. This action is counteracted by a cartridge 231 having a plunger 233 which is biased by a spring 235 against the opposite edge of the swash plates. The force applied by the spring 235 to the plunger 233 biases the swash plates to a minimum flow position which is set by an adjustable threaded stop 237 for plunger 229. When the force generated by the hydraulic fluid acting against plunger 229 exceeds the bias force of spring 235 the swash plates 189 tilt to increase pump output. Maximum pump output is adjustably set by a screw stop 239 which limits movement of the plunger 233.

Figure 16:
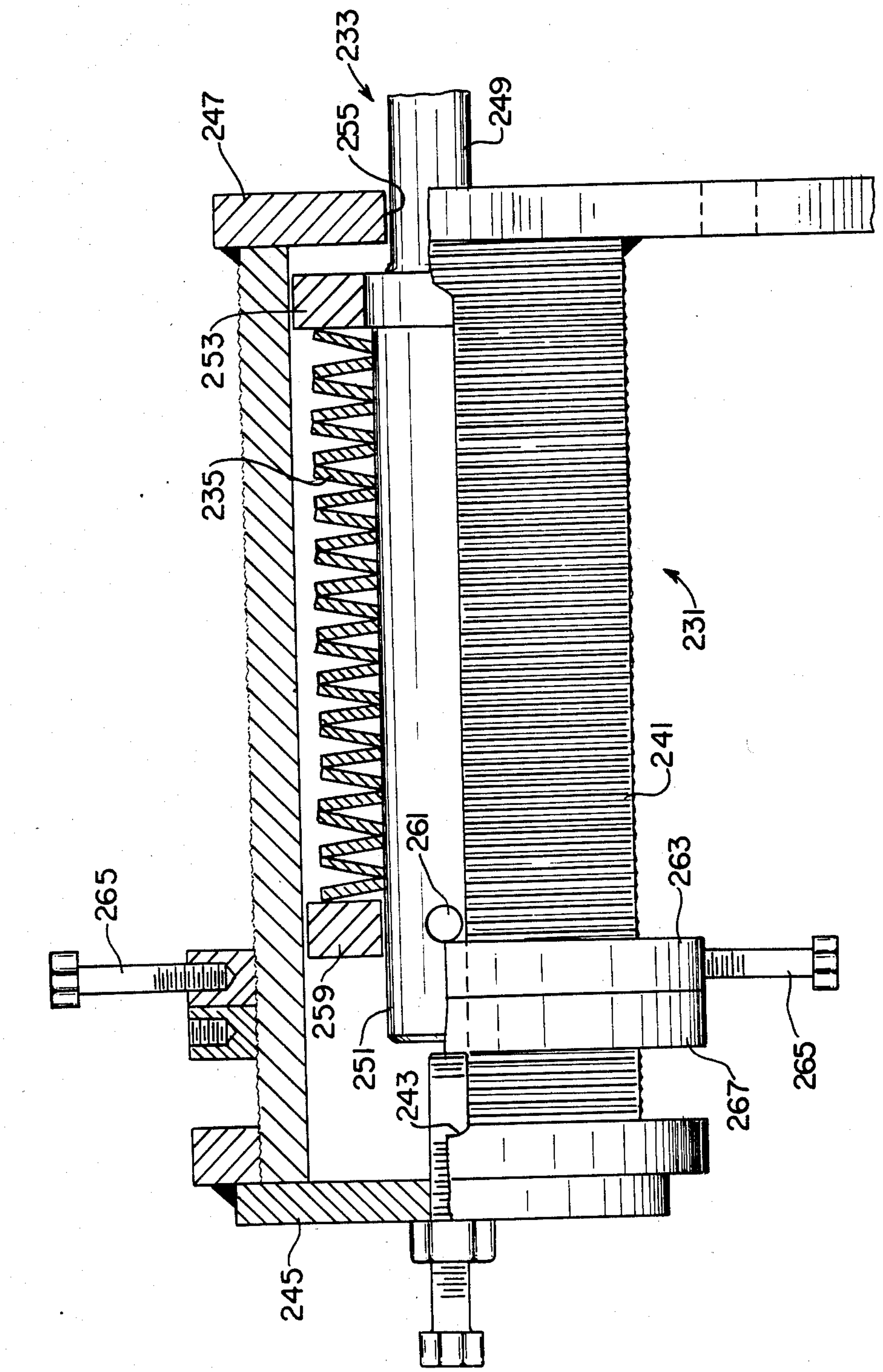
FIG. 16 is a side view, with some parts cut away, of the mechanical details of a cartridge which is part of the hydraulic system of FIG. 15.

The details of the cartridge 231 are shown in FIG. 16 in which some parts are cut away to reveal the internal structure. The cartridge includes an externally threaded, hollow cylindrical housing 241 which is provided with diametrically opposed longitudinal slots 243 (only one visible). The housing 241 is closed at one end by a cap 245 and at the other end by a plate 247 which also serves as a mounting bracket. The plunger 233 which is axial slideable in the housing 241 is divided into first and second portions, 249 and 251 respectively, by a radial flange 253. The first portion 249 protrudes through an aperature 255 in plate 247 and bears against the swash plates of the variable displacement pumps as shown schematically in FIG. 15. A number of Belleville spring washers 235 are mounted on the second portion 251 of the plunger 233 between the radial flange 253 and a slideable ring member 259. A pair of pins 261 (only one visible in FIG. 15) which are screwed into the cylindrical outer surface of the ring member 259 extend radially outward through the slots 243 beyond the outer surface of housing where they are biased by Belleville springs 235 against the side of an internally threaded stop member 263 which is threaded onto the housing 241. A pair of bolts 265 provide leverage for threading the stop member 263 along the housing and internally threaded locking plate 267 locks the stop member 263 in the desired position on the housing 241. The position of the stop member 263 determines the preloading on the Belleville springs 235 which in turn determines the pressure at which the volumetric outputs of the variable displacement pumps 185 begin to ramp up. The bolt 269 extending axially through cap 245 with its locknut 271 serve as the adjustable stop means 239 which limits the travel of the plunger 233 and thereby sets the maximum flow rate for the pumps.

Operation of the double press is as follows. Starting with the mold carriages 63 advanced with the molds 65 abutting the fixed plates 161 on opposite sides of the transverse wall 13 and with the dies 59 retracted, all as shown in FIG. 3, slurry from a hopper 175 is fed through conduits 75 into bores 71 of the mold carriages and bores 95 of the molds. With solenoids 205 and 209A energized, hydraulic fluid under pressure from pumps 185 is then introduced through line 191R and passage 55 into kicker cylinders 25 which through their pistons 49 and piston rods 53 and piston rods 31 of main hydraulic cylinders 23, advance the dies 59 toward the transverse wall 13. As pistons 29 of the main hydraulic cylinders are advanced with their piston rods 31, prefill valves 41 admit hydraulic fluid from reservoir 45 behind the pistons.

The kicker cylinders 25 being of small cross-sectional area advance the dies 59 at a relatively rapid rate toward the transverse wall 13. As the platens 149 enter the respective sealing and collector rings 67, solenoids 205 and 209A are deenergized and solenoids 193 are energized to place the main hydraulic cylinders 23 into operation. Since the mold cavities are now enclosed, further advance of the dies forces the liquid phase of the slurry, and initially some of the granular material, through the slots 151 and 163 in platens 149 and 161 respectively until the granular material bridges the slots and only liquid is expressed. Effluent expressed through platens 161 is directed by the grooves 167 and channels 169 in sub-platens 165 into collecting channels 171 from which it is discharged through channels 173. Effluent passing through grooves 151 in platens 149, is collected in the grooves 157 in sub-platens 155 and diverted radially outward through channels 159 into the clearances between the dies 59 and the bores 95 of the respective molds. The effluent is then forced back along the outer surface of the dies to the annular grooves 103 in sealing and collector rings 67 where it flows angularly around the grooves, radially out through slots 99, axially along bores 105 into annular passages 111 and then through passages 113 into discharge tubes 115. The platens 149 are slightly larger in diameter than dies 59 so that the clearances between the platens and the walls of the bores 95 in molds 65 are no greater than the width of the slots 151 in the platens. Also, the clearances between the dies 59 and the bores 101 in rings 67 are such that the expressed effluent takes the path of least resistance through the grooves 103, slots 99 etc., rather than passing into the bores 171 in the mold carriages 63 where it would dilute the feed. The slots 99 in the sealing and collector rings 67 are the same width as the slots 151 in platens 149 so that as the dies 59 enter the sealing rings, and before the platens 149 extend into the bores 95 of molds 65, excessive amounts of granular material are not lost through the discharge.

Since pistons 29 of the main cylinders 23 are much larger than pistons 49 in the kicker cylinders 25 they generate proportionally higher forces for the same hydraulic pressure but advance the dies at a slower rate of speed for the same flow rate of pressurized hydraulic fluid. This slower rate of advance of the dies allows the granular material to form bridges over the slots in the platens. It is then desirable to increase the speed of advance of the dies in order to achieve a satisfactory production rate. Accordingly, solenoid valve 227 is energized and when the hydraulic pressure in the main cylinders which is fed back through pilot line 225 to the chamber 223 exceeds the preset pressure set by the bias on springs 235 indicative that the bridges have formed, the swash plates 189 of pumps 185 are tilted to increase the rate of flow of hydraulic fluid to the main cylinders 23. If the hydraulic pressure in one of the main cylinders exceeds that in the other by an amount set by the spring biases on pressure equalization valves 197, the valve connected to the higher pressure cylinder will open to dump hydraulic fluid to the reservoir through line 199 until the pressure differential is within limits. Should for some reason a piston 29 advance too far, it strikes a spring loaded plunger 177 in the associated end plate 19 which actuates a micro switch 179 to terminate the flow of pressurized hydraulic fluid before damage is done to the press.

Removal of the liquid through the platens 149 and 161 results in the formation in the molds 65 between the platens of pucks of granular material. The pressures applied and the dwell times are selected so as to provide an end product with a satisfactory moisture content at a reasonable rate of production. When these parameters are met, solenoid valves 193 are deenergized to reduce pressure in the main cylinders 23 by dumping hydraulic fluid through lines 195 to the reservoir 45. Then solenoids 205 and 209B are energized to actuate the kicker cylinders 25 to withdraw the dies 59 partially to release the pucks from platens 149. Solenoid valve 217B is then energized to actuate the cylinders 83 to withdraw the mold carriages 61, and therefore the molds 65 which carry with them the pucks from the transverse wall 13. Continued withdrawal of the mold carriages brings the pucks into contact with the partially withdrawn dies 59 which strip them from the molds 65. The pucks then fall through the opening 11 in the bottom of the main frame into chutes 181 which deposit them onto a transverse conveyor 183. Cylinders 83 are then actuated through energization of solenoid 217A to return the mold to butting relationship with the platen 161 and kicker cylinder 25 is again actuated through energization of solenoid 209B to withdraw the die 59 to the starting position shown in FIG. 3. As the dies are being withdrawn by the kicker cylinders 25, the working pressure in these cylinders is utilized through the pilot line 215 to open the prefill valves 41 so that the large volumes of hydraulic fluid trapped in the main cylinders can be returned to the reservoir at a rate which permits rapid resetting of the dies.

Although the hydraulic cylinders on the two sides of the press could be interconnected so that equal pressures would be developed on both sides of the wall 13, we have found that it is preferred to have the two sides develop their own pressures within preset limits. In this manner each press unit can operate at its most efficient rate and the combined presses are not always working at the lowest pressure in the two opposed cylinders. Since the pressure differential is limited the two pressures are not grossly different at any instant, so that they still substantially offset each other and therefore reduce the loading on the transverse wall 13.

Any number of the presses 1 can be arranged side-by-side along the conveyor 183 sharing a common feed hopper 175. In a preferred arrangement, two of the presses 1 are mounted side-by-side on the same frame to form a modular unit capable of producing 4 pucks simultaneously. Any number of these units can be arranged along the conveyor 183.

For slurries with different sized granular particles, platens, sub-platens, and sealing and collector rings with the appropriately sized slots and grooves can easily be installed and where it is desired to make a puck of different diameter, the mold 65 and die 59 can also be easily replaced. Thus, the apparatus of the invention not only rapidly and efficiently produces pucks of granular material, but can easily be adjusted to accommodate different feed materials.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A platen for use in a press in which the liquid phase is removed from a slurry of fine granular material by compressing the slurry against the platen, said platen comprising a planar member defining arcuate slots forming a pattern of segmented concentric annular openings through which the liquid phase is expressed.

2. The platen of claim 1 wherein said segmented concentric annular openings are defined by arcuate ribs of said planar member, the length of the arcuate slots being selected such that all of the ribs have essentially the same radial strength determined by the radial width of the rib, the radius of curvature of the rib and the length of the rib.

3. The platen of claim 2 wherein the radial width of each segmented concentric annular opening is the same and is at least as large as the largest particle in the fine granular material.

4. The platen of claim 3 wherein the total area of the arcuate slots across the planar member is maximized for a preselected slot width and a preselected radial strength for each of the arcuate ribs.

5. The platen of claim 4 in combination with a subplaten to be mounted behind said platen, said subplaten comprising a planar member defining a plurality of concentric, continuous annular grooves in the surface thereof facing said platen, the radii of said grooves being the same as the radii of the arcuate slots in said platen such that said grooves register with said arcuate slots and wherein said planar member defines radial grooves which communicate with said annular grooves and extend radially outward to the edge of said planar member such that liquid expressed through said arcuate slots in said platen enters said annular grooves in the subplaten and passes angularly around said annular grooves to said radial grooves through which it passes radially outward for discharge.

6. Apparatus for separating the liquid phase from a slurry of fine granular material comprising:

a mold housing defining an elongated bore therethrough and a feed opening extending through the side of the mold housing and into the elongated bore near one end of the housing through which slurry is introduced into said bore;

an end member against which the second end of said mold housing seats to close off the associated end of the elongated bore to form a mold chamber;

a piston extending into the elongated bore from the first end of the mold housing and slidable therein toward and away from the end member to apply pressure to slurry in the bore between the feed opening and the end member, said piston being retractable toward the first end of the housing to permit introduction of slurry into the bore through the feed opening;

a platen mounted on the end of the piston and having drain openings therethrough through which the liquid phase of the slurry is expressed as the piston advances toward the end member;

means for directing the liquid which passes through the platen radially outward to the outer surface of the piston where it passes back along the piston in the clearance between the piston and the bore; and collection means in the form of an annular restriction in the wall of the bore adjacent the feed opening through which the piston and platten are slidably withdrawn for loading of slurry into the mold chamber and which forms a restriction for said piston during advance of the piston toward the end member, said restriction having a plurality of longitudinal slits spaced angularly around the bore and extending radially outward, and at least one annular groove communicating with the bore and intersecting said longitudinal slits to direct expressed liquid which flows axially along the piston angularly around the piston to the slits.

7. The apparatus of claim 6 wherein the width of said longitudinal slits is essentially the same size as the smallest dimension of the drain openings in the platten and larger than the clearance between the piston and the restriction.

8. The apparatus of claim 7 wherein said platen is larger in diameter than said piston and the clearance between the platen and the bore is no larger than the smallest dimension of said drain openings yet said platen can pass through said restriction.

9. The apparatus of claim 8 including longitudinal passages at the outer radial extremity of said longitudinal slits and an annular passage which intersects each of said longitudinal passages for collecting expressed fluid which passes radially outward through said slits.

10. The apparatus of claim 9 wherein said mold housing comprises a mold carriage having a longitudinal bore and said feed opening near one end extending through the side of the mold carriage and into said longitudinal bore, and a replaceable cylindrical mold insertable from the second end of said mold into said longitudinal bore and having said elongated bore in which said piston is slidable, and wherein said collection means comprises a ring member having said longitudinal radially extending slits, annular groove, and longitudinal passages at the radial extremity of each said slit which is retained within the longitudinal bore in the mold carriage by said replaceable cylindrical mold and forms therewith said annular passage which collects expressed fluid from said slits.

11. Apparatus for separating the liquid phase from a slurry containing fine granular material, comprising:

a housing forming a chamber having a rigid vertical wall at one end;

a hydraulic cylinder mounted to the housing at the other end of the chamber and having a piston reciprocably movable generally horizontally through said chamber toward and away from said rigid vertical wall;

a mold having a cylindrical bore extending horizontally therethrough, said mold being slidably mounted on, and essentially supported by, the piston which slidably extends into the bore at a first end of said mold, said mold defining a feed opening in the top thereof proximate said first end through which slurry is introduced into the bore, mold positioning means connected to the mold and the housing for sliding said mold along the piston between a pressing position in which the mold is positioned against the rigid vertical wall to form a mold cavity into which slurry is introduced through said feed opening with the piston retracted beyond the opening and then extended toward the rigid vertical wall to apply pressure to the slurry and form a puck of the granular material, and a puck stripping position in which the mold in displaced from the rigid vertical wall as the piston remains extended to strip the puck from the mold;

means for directing liquid expressed from the slurry by advance of the piston toward the rigid vertical wall back along the piston through a clearance between the piston and said bore;

collecting and sealing means comprising a ring extending into the bore in the mold adjacent the feed opening in the direction of said second end to prevent expressed liquid from being expressed through the feed opening and thereby diluting the slurry, said means comprising a ring extending into the bore and having passages therethrough through which expressed fluid is removed from said bore; and means on the first end of said mold for adjusting the alignment of said mold relative to the longitudinal axis of the piston to compensate for droop of the mold when the piston is withdrawn in the bore to place the feed opening in communication with the mold cavity such that when the piston is again advanced toward the rigid vertical wall, it registers with said ring without binding.

12. The apparatus of claim 11 wherein said means for adjusting the alignment of said mold relative to the longitudinal axis of the piston comprises a frame extending from the first end of the mold member which surrounds but is spaced from said piston, said frame defining a bearing surface facing the piston and inclined at an angle to the longitudinal axis of the mold bore, a bearing member having a bearing surface in sliding contact with the bearing surface on said frame and a support surface for contacting the side of the piston, and means for selectively positioning the bearing member longitudinally relative to said frame by sliding said bearing member along the bearing surface on said frame, said bearing surface on said bearing member making an equal but opposite angle with the longitudinal axis of the mold bore as the frame bearing surface such that as the bearing member is moved relative to the frame, the frame is moved radially relative to the piston to adjust the alignment of the mold relative to the longitudinal axis of the piston.

13. The apparatus of claim 12 wherein said frame housing defines two axially displaced bearing surfaces facing said piston inclined at angles to the longitudinal axis of the mold bore and including a bearing member associated with each bearing surface, each of said bearing members having a bearing surface in sliding contact with the associated bearing surface and a support surface for contacting the side of the piston, and means for selectively positioning the bearing members relative to the associated bearing surfaces.

14. The apparatus of claim 13 wherein said frame defines a longitudinal bore in which said piston is received and wherein said bearing surfaces are defined by counterbores in each end of the frame bore inclined at said angles to the longitudinal bore in said frame and wherein said bearing members comprise ring members having the axis of their outer surfaces which form said bearing surfaces inclined at said angles to the axes of their central bores which define said support surfaces.

15. The apparatus of claim 14 wherein said means for selectively positioning the bearing members longitudinally relative to said frame comprise elongated members extending longitudinally from a first end of said frame remote from the mold member.

16. The apparatus of claim 15 wherein said elongated members comprise a first set of bolts which when rotated, longitudinally adjust the position of the first bearing member adjacent said first end of the frame with respect to the frame and a second set of bolts which when rotated longitudinally adjust the position of the bearing member adjacent the other end of the frame.

17. The apparatus of claim 16 wherein the bolts in each set of bolts are equiangularly spaced about the piston with the bolts in the two sets alternating and wherein the bolts of the second set pass through the first bearing member but are not coupled thereto so that rotation of said second set of bolts effects longitudinal movement of only the second bearing member.

18. The apparatus of claim 11 wherein the means for directing liquid expressed from the slurry back along the piston include a platen having openings through which the liquid passes mounted on the end of the piston and a sub-platen having passages which collect the expressed liquid and direct it radially outward to the clearance between the piston and the bore in the mold member, said platen being larger in diameter than said piston with the width of the annular clearance between the platten and the bore being about the same width as the smallest dimension of the openings in the platen yet smaller in diameter than the inner diameter of said collecting and sealing ring such that said platten can be withdrawn through said ring for loading slurry into the mold bore and can be reinserted through said ring for removing the liquid from the slurry.

19. The apparatus of claim 11 wherein said housing defines a second chamber on the other side of said rigid vertical wall from the first chamber and including a second hydraulic cylinder mounted to the housing at the remote end of said second chamber and having a piston reciprocably movable through said second chamber toward and away from said rigid vertical wall in axial alignment with said first piston, a second mold slidably mounted on and essentially supported by the piston of said second hydraulic cylinder and having a feed opening through which slurry is introduced into the second mold means for directing expressed liquid from slurry in said second mold back along the second piston, a collecting and sealing ring in said second mold for preventing expressed liquid from being expressed through the feed opening and means on a first end of the second mold for adjusting the alignment of said second mold relative to the longitudinal axis of said second piston.

20. Apparatus for separating the liquid phase of a slurry containing fine granular material, comprising:

a housing having an elongated horizontal chamber, a rigid vertical wall extending transversely across said horizontal chamber dividing the same into two chambers;

a hydraulic cylinder mounted at each end of the housing and having a piston which is extendable and retractable through the adjacent chamber toward said rigid vertical wall;

a mold having a bore therethrough slideable mounted on and essentially solely supported by each piston; said molds each having a feed opening in the top thereof which communicates with said bore but is closed by the sliding of said piston in the bore; and mold positioning means for moving said molds along the associated piston toward and away from the rigid vertical wall comprising a pair of actuating means connected to each mold and the housing at diametrically opposite points with the actuating means associated with one mold angularly displaced relative to those of the other mold and longitudinally overlapping said other actuating means.

21. Apparatus for separating the liquid phase from a slurry of fine granular material, comprising:

a rigid planar member;

a pair of molds each comprising a housing with a bore extending therethrough positioned one on each side of said rigid planar member with said respective bores substantially in axial alignment and with said rigid vertical member closing off one end of each bore to form therewith a mold cavity;

an elongated die slideably insertable in sealing relation in the other end of each bore to compact slurry in the associated mold cavity;

means for advancing each die toward said rigid planar member including means for permitting the forces exerted on opposite sides of said rigid planar member by advancement of said dies toward each other to vary with respect to one another within predetermined limits; and means for expressing liquid from said mold cavities as said slurry is compacted.

22. The apparatus of claim 21 wherein said advancing means comprises a hydraulic cylinder connected to each die and pressurized hydraulic fluid supply means for actuating said hydraulic cylinders, and wherein said means for permitting the forces applied to opposite sides of said rigid planar member to vary comprise means which limit the pressure differential in the hydraulic fluid supplied by the pressurized hydraulic fluid supply means to said hydraulic cylinders to a preset valve.

23. The apparatus of claim 22 wherein said differential pressure limiting means comprises means responsive to the hydraulic pressure in each of said hydraulic cylinders for bleeding hydraulic fluid from the hydraulic cylinder with the highest pressure when said pressure differential reaches said preset limit.

24. Apparatus for separating the liquid phase from a slurry of fine granular material, comprising:

a mold defining a bore closed on one end;

a piston slideable in sealing relation in said bore to form therewith a mold cavity, said cavity having drain openings therein each having a smallest dimension which is one to five times the size of the largest granule in said slurry;

means for introducing said slurry into said mold cavity; and means for advancing said piston in said bore to apply pressure to express the liquid phase of said slurry through said drain openings and thereby form a consolidated puck of said fine granular material including means for increasing the rate of advancement of said piston after the granules in said fine granular material have formed bridges over said drain openings.

25. The apparatus of claim 24 wherein said means for advancing said piston include a hydraulic cylinder connected to said piston, a variable displacement pump for delivering pressurized hydraulic fluid to said hydraulic cylinder and means responsive to an increase in the pressure of the hydraulic fluid in said hydraulic cylinder for increasing the volumetric output of said variable displacement pump when the pressure exceeds a preselected pressure indicative that said bridges have been substantially formed.

26. The apparatus of claim 25 wherein said variable displacement pump has a swash plate for varying the volumetric output and wherein said pressure sensitive means includes a first plunger, means biasing said first plunger against one edge of said swash plate to urge the pump toward a minimum volumetric output position and a second plunger which is urged against the opposite edge of the swash plate by pressurized hydraulic fluid delivered through a line connected to said hydraulic cylinder to urge said swash plate toward a maximum volumetric output position against the bias applied to the first plunger, said bias being selected such that said swash plate remains in said minimum output position until the hydraulic pressure in said hydraulic cylinder reaches said preselected value, and means for limiting the travel of said first plunger in response to increased hydraulic pressure to set the maximum pump output and means for limiting the travel of said second plunger in response to the bias on said first plunger to set the minimum pump output.

27. The apparatus of claim 26 wherein said first plunger is provided with a radial projection intermediate its ends which divides said plunger into a first portion and a second portion with the first portion bearing against said swash plate, said combination further including a ring member slideable along the second portion of said first plunger, cylindrical compression spring means comprising said biasing means mounted on said second portion of said first plunger and bearing against said projection and said ring member, a cylindrical housing within which said second portion of the first plunger and said ring member are slideable, said housing defining at least one longitudinal slot, a radial extension on said ring member which extends outward through said longitudinal slot and stop means on said housing which engages said radial extension to restrain said ring member and which is movable longitudinally along the housing to fix the position of said ring member and thereby set the spring bias on said first plunger to a value which resists movement of the swash plate until the pressure in the hydraulic cylinder reaches said preselected value.

28. The apparatus of claim 27 wherein said cylindrical housing is threaded externally and wherein said stop means comprises a nut which engages said threads.

* * * * *